May 29, 1928. 1,671,245

F. KRAUS

ALTERNATING CURRENT RECTIFIER

Filed April 15, 1926

INVENTOR:
Ferdinand Kraus
BY: Ruege, Boyer & Bakelar
ATTORNEYS.

Patented May 29, 1928.

1,671,245

UNITED STATES PATENT OFFICE.

FERDINAND KRAUS, OF RODENKIRCHEN, NEAR COLOGNE, GERMANY.

ALTERNATING-CURRENT RECTIFIER.

Application filed April 15, 1926, Serial No. 102,164, and in Germany April 24, 1925.

This invention relates to improvements in alternating current rectifiers employed for the purpose of converting alternating into direct current. The use of a tuned spring set in synchronous vibration by an alternating current magnet and provided with contacts whereby the direction of the alternating current is reversed, so that direct current is obtained, is known. Hitherto the difficulty with such rectifiers consisted in imposing on the vibratory spring a frequency of vibration which was equal to the periodic frequency of the alternating current to be rectified. For this purpose auxiliary devices were hitherto necessary which made the rectifier complicated and expensive.

These disadvantages are obviated by the present invention which enables the magnet to be excited directly by the alternating current to be rectified without the use of an auxiliary device of any sort. According to the present invention a spring, set in vibration by an alternating current magnet, vibrates, on one side, with its entire length, and on the other side, with a part only of its length. The frequency of vibration of this part is double that of the alternating current, so that the total period of vibration of the combined spring corresponds to the period of the alternating current to be rectified, and the latter, therefore, may be rectified directly by the reversing contacts.

Figure 1:
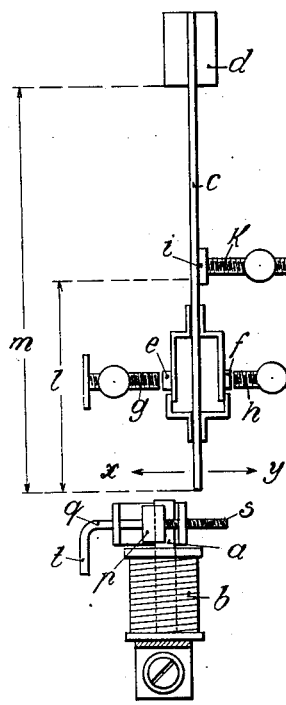
Figure 2:
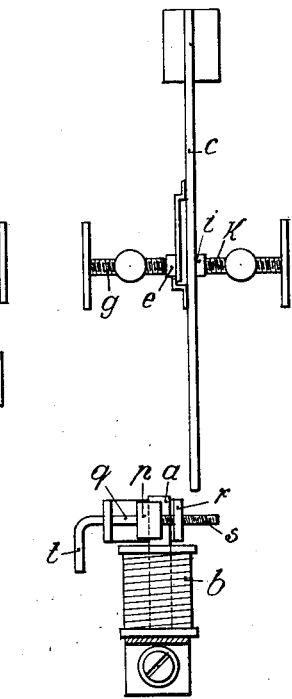
Figure 3:
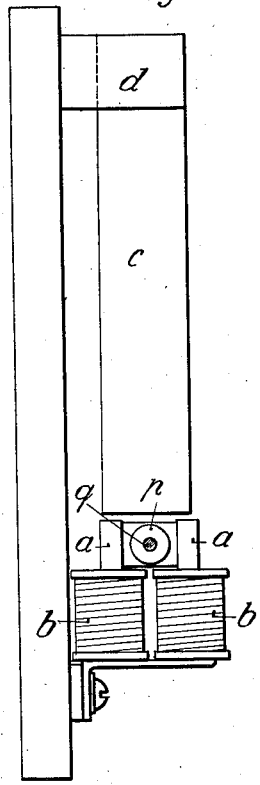
Figure 4:
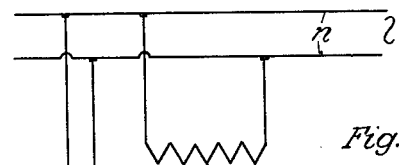

Two forms of alternating current rectifier according to the invention are illustrated by way of example in the drawings in which Figures 1 and 2 are side elevations, Fig. 3 is a front elevation of either of the rectifiers shown in Figs. 1 and 2 the contacts and stop being omitted, and Fig. 4 is a diagram of the electrical connections. Two coils $b$ connected in series and passed through by the alternating current are mounted on the two iron poles $a$ of the magnet. In front of the poles and somewhat to one side thereof oscillates the pendulous spring $c$ which is mounted at $d$. In Fig. 1 the spring is provided with resilient contacts $e$ and $f$ opposite which are disposed contact screws $g$ and $h$. The spring $c$ has in addition a stop $i$ which, in the position of rest, bears with a certain pressure due to its resilience on the adjustment screw $k$. The pressure may be varied by rotation of the latter. If the magnet is excited then the spring immediately vibrates at first with the length $l$ and with double the frequency of the alternating current, for which purpose the length $l$ is tuned in accordance with the said double frequency. Due to the resonance the spring strikes on each vibration to the left, namely in the direction of the arrow $x$ and back, the stop $i$. Each half vibration to the left and back is therefore executed with the entire length $m$ of the spring, whereas the vibration to the right, namely in the direction of the arrow $y$, and back is carried out with the reduced length $l$. The proportion of the lengths is so chosen that the total period of vibration is exactly double the duration of the period of vibration of the shortened spring, that is, exactly the period of the alternating current. If the stop screw $k$ and the contact screws $g$ and $h$ are correctly adjusted the spring passes through the mean position at the same moment as the phase of the alternating current passes through zero. The usual reversal of connections is at that moment effected by the contacts $e$ and $f$, this being clearly shown in the diagram. (Figure 4). The alternating current in the mains $n$ may be taken at the terminals $o$ as a pulsating direct current.

The rectifier shown in Fig. 2 differs from that in Fig. 1 only in that the stop $i$ which is mounted on the adjustment screw $k$ is itself employed as a reversing contact.

During variation of voltage in the mains the power of the magnet $a$, $b$ also varies, so that trouble, in particular the formation of sparks, may easily occur. In order to render these variations innocuous the following arrangement is made:—

A round iron core $p$ is arranged between the two poles $a$ of the alternating current magnet on a spindle $q$ which is mounted in the one bearing $r$ with a screw thread $s$ and is provided at the other end with a handle $t$. By rotation of the spindle the iron core $p$ may be moved between the two magnet poles $a$ so as to draw to itself a larger or smaller proportion of the magnetic lines of force. It is thus possible, on the occurrence of an alteration of voltage in the mains, to adjust, in accordance therewith, the attraction of the magnet on the vibratory spring so that the impulses on the tuned spring always remain the same and the contacts operate without sparking.

Having now particularly described and ascertained the nature of my said invention and in what manner the same is to be performed, I declare that what I claim is:—

1. An alternating current rectifier, comprising a magnet connected in circuit with the current to be rectified, an unpolarized oscillatory spring fixed at one end and disposed in position to be oscillated by current impulses passing through the magnet, contact forming members carried by said spring, and means for interrupting the movement of the spring in one direction whereby its oscillations in said direction are fore-shortened, the entire duration of a complete oscillation of the spring corresponding with the period of the alternating current to be rectified.

2. An alternating current rectifier, comprising a magnet connected in circuit with the current to be rectified, an unpolarized oscillatory spring fixed at one end and disposed in position to be oscillated by current impulses passing through the magnet, contact forming members carried by said spring, and means for interrupting the movement of the spring in one direction whereby its oscillations in said direction are fore-shortened, the entire duration of a complete oscillation of the spring corresponding with the period of the alternating current to be rectified, said interrupting means operating also as a contact member disposed in position to form electrical contact with one of the contact-forming members of the spring.

3. An alternating current rectifier, comprising a magnet connected in circuit with the current to be rectified, an unpolarized oscillatory spring fixed at one end and disposed in position to be oscillated by current impulses passing through the magnet, contact forming members carried by said spring, means for interrupting the movement of the spring in one direction whereby its oscillations in said direction are fore-shortened, the entire duration of a complete oscillation of the spring corresponding with the period of the alternating current to be rectified, an adjustable iron core disposed between the poles of said magnet, and means for adjusting said core to compensate for variations of voltage in the current-supplying mains.

In testimony whereof I have signed my name to this specification.

FERDINAND KRAUS.